(12) United States Patent
Schröder

(10) Patent No.: US 9,624,075 B2
(45) Date of Patent: Apr. 18, 2017

(54) DRUM HOIST WITH A DRIVEN MAIN SHAFT

(71) Applicant: OLKO-MASCHINENTECHNIK GMBH, Olfen (DE)

(72) Inventor: Walter Schröder, Freudenberg (DE)

(73) Assignee: OLKO-MASCHINENTECHNIK GMBH, Olfen (DE)

( * ) Notice: Subject to any disclaimer, the term of this patent is extended or adjusted under 35 U.S.C. 154(b) by 318 days.

(21) Appl. No.: 14/386,885

(22) PCT Filed: Sep. 13, 2013

(86) PCT No.: PCT/EP2013/068997
§ 371 (c)(1),
(2) Date: Sep. 22, 2014

(87) PCT Pub. No.: WO2014/053299
PCT Pub. Date: Apr. 10, 2014

(65) Prior Publication Data
US 2015/0076428 A1    Mar. 19, 2015

(30) Foreign Application Priority Data

Oct. 2, 2012 (DE) .......................... 10 2012 109 398

(51) Int. Cl.
*B66D 1/10* (2006.01)
*B66D 1/14* (2006.01)
(Continued)

(52) U.S. Cl.
CPC .................. *B66D 1/14* (2013.01); *B66D 1/26* (2013.01); *F16D 11/04* (2013.01); *F16D 11/10* (2013.01); *F16D 11/14* (2013.01)

(58) Field of Classification Search
CPC . B66D 1/14; F16D 11/04; F16D 11/10; F16D 11/14; F16D 2011/004; F16D 2011/006
See application file for complete search history.

(56) References Cited

U.S. PATENT DOCUMENTS 3,411,751 A * 11/1968 Pooley, Jr. ............... B66D 1/14
                                                                254/342
3,563,353 A *  2/1971 LoPresti .................. F16D 11/10
                                                                188/83
(Continued)

FOREIGN PATENT DOCUMENTS

DE                922194           1/1955

*Primary Examiner* — Emmanuel M Marcelo
(74) *Attorney, Agent, or Firm* — Lucas & Mercanti, LLP

(57) ABSTRACT

A drum hoist including a movable drum which is arranged on a main shaft with a coupling apparatus for the releasable connection of the movable drum and the main shaft, a drum wheel which is connected fixedly to the movable drum so as to rotate with it, and a coupler wheel which can be displaced axially in an engagement direction and a disengagement direction with respect to the main shaft. In order to effectively prevent undesired disengagement of a coupler wheel of the coupling apparatus without mounting additional elements, coupling elements are arranged between the drum wheel and the coupler wheel which can be engaged and disengaged, which coupling elements can be brought into and out of engagement by a rotation of the engaged coupler wheel with respect to the drum wheel by the amount of the tooth flank play between the toothing systems of the two wheels.

13 Claims, 13 Drawing Sheets

(51) Int. Cl.
  *F16D 11/04*  (2006.01)
  *F16D 11/10*  (2006.01)
  *F16D 11/14*  (2006.01)
  *B66D 1/26*  (2006.01)

(56) References Cited

U.S. PATENT DOCUMENTS

| | | | | |
|---|---|---|---|---|
| 3,589,243 | A * | 6/1971 | Bowman | F03C 1/0531 |
| | | | | 91/180 |
| 3,709,343 | A * | 1/1973 | Sigg | F16D 11/10 |
| | | | | 192/108 |
| 3,728,914 | A * | 4/1973 | Guangorena | B66D 1/7431 |
| | | | | 254/354 |
| 3,744,760 | A * | 7/1973 | Uher | B66D 1/72 |
| | | | | 192/12 B |
| 4,155,267 | A * | 5/1979 | Notestine | F16H 3/22 |
| | | | | 74/342 |
| 7,891,641 | B1 * | 2/2011 | Miller | B66D 1/16 |
| | | | | 254/344 |
| 2004/0060377 | A1 * | 4/2004 | Rankin | F16D 11/04 |
| | | | | 74/329 |
| 2007/0140772 | A1 * | 6/2007 | Baringa | B41J 23/02 |
| | | | | 400/636.2 |
| 2008/0116431 | A1 * | 5/2008 | Elliott | B66D 1/22 |
| | | | | 254/355 |
| 2011/0049450 | A1 * | 3/2011 | Hager | B66D 1/12 |
| | | | | 254/343 |
| 2012/0279334 | A1 * | 11/2012 | Gaully | F02C 7/275 |
| | | | | 74/333 |
| 2014/0367216 | A1 * | 12/2014 | Raszkowski | F16D 11/14 |
| | | | | 192/69.8 |
| 2016/0116001 | A1 * | 4/2016 | Beeri | F16D 3/70 |
| | | | | 192/69.8 |

* cited by examiner

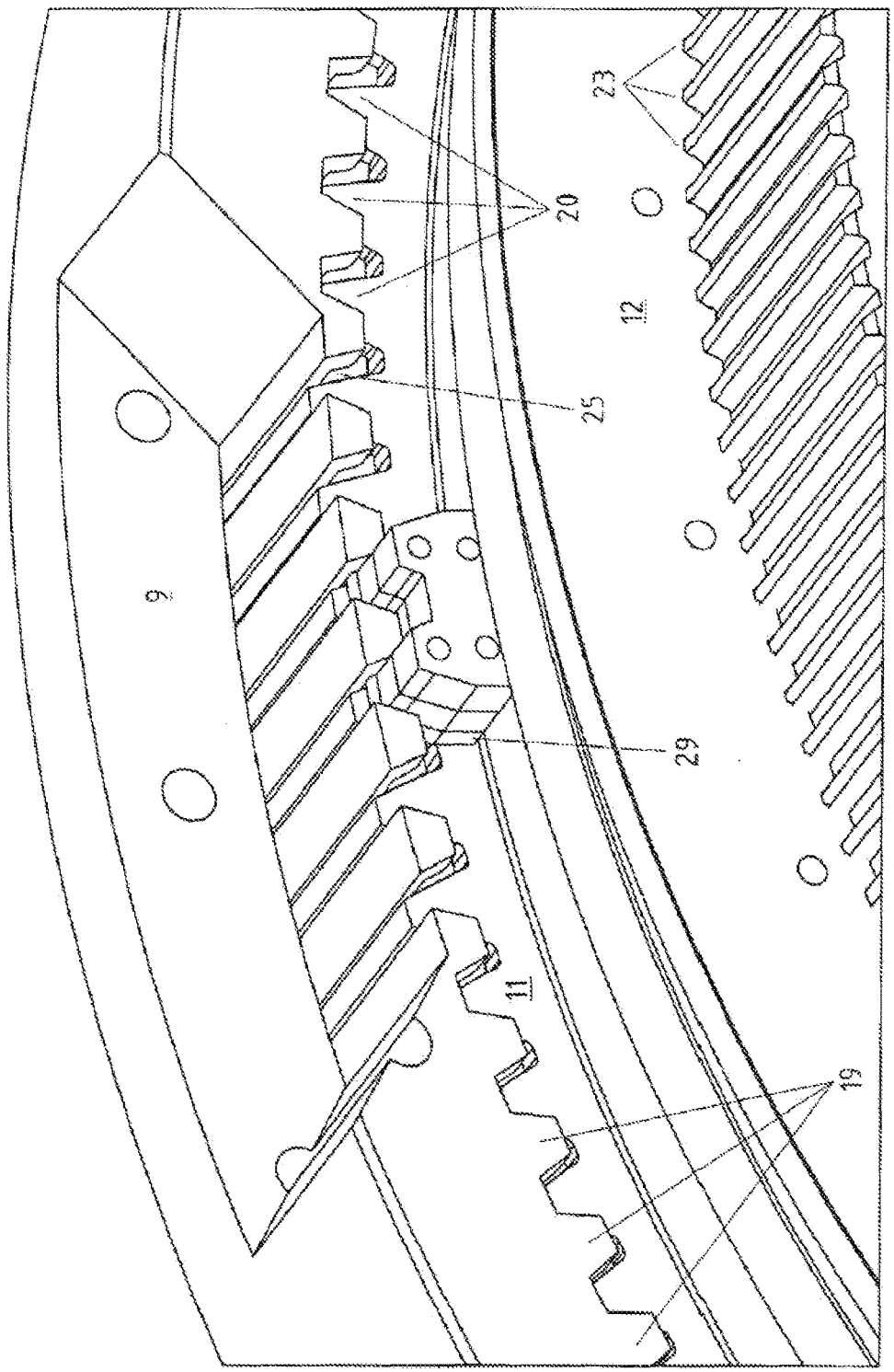

DRUM HOIST WITH A DRIVEN MAIN SHAFT

CROSS-REFERENCE TO RELATED APPLICATIONS

This application is a 371 of PCT/EP2013/068997 filed Sep. 13, 2013, which in turn claims the priority of DE 10 2012 109 398.9 filed Oct. 2, 2012, the priority of both applications is hereby claimed and both applications are incorporated herein by reference.

BACKGROUND OF THE INVENTION

The invention relates to a drum hoist having a driven main shaft, at least one movable drum which is arranged on the main shaft with a locking brake, a coupling apparatus for the releasable connection of the movable drum and the main shaft, which drum hoist has a drum wheel with an internal toothing system, which drum wheel is connected fixedly to the movable drum so as to rotate with it, a shaft wheel with an external toothing system, which shaft wheel is connected fixedly to the main shaft so as to rotate with it, a coupler wheel with an external toothing system and an internal toothing system which can be displaced axially in an engagement and a disengagement direction on the external toothing system of the shaft wheel, a sliding ring which is connected fixedly on the end side to the coupler wheel so as to rotate with it, and a switching apparatus which is arranged fixedly on the frame of the drum hoist for displacing the sliding ring in an engagement and disengagement direction, it being possible for the external toothing system of the coupler wheel to be brought into engagement with the internal toothing system of the drum wheel by way of the axial displacement in the engagement direction and to be brought out of engagement by way of the axial displacement in the disengagement direction. Moreover, the invention relates to a method for engaging and disengaging a coupling apparatus of a drum hoist of this type.

In a drum hoist, a cable drum is used as cable carrier, onto which cable drum the conveying cable is wound or from which cable drum said conveying cable is unwound. A distinction is made between single drum hoists and double drum hoists. Double drum hoists can be configured, for example, as Blair hoists or bobbins. There are double drum hoists both with a fixed drum and a movable drum and with two movable drums. Here, the movable drums are connected releasably to the main shaft via a switchable coupling, the coupling apparatus. It is necessary for every movable drum of the drum hoist that there is a separate brake for the movable drum for coupling.

The winding direction of the cable on the drums of the double drum hoist is opposed, with the result that the cable of one drum is wound up and the other is unwound in an identical rotational direction of the main shaft.

Both drums can be offset relative to one another in the circumferential direction with the aid of the coupling apparatus. To this end, the movable drum is blocked by way of the brake which is assigned to it, and is decoupled from the further drum, in particular a fixed drum. As a result, the movable drum does not corotate during positioning of the second conveying means with the aid of the further drum. After the second conveying means is positioned at the desired location, the movable drum is coupled to the drive shaft again and the brake is released. Double drum hoists with coupling apparatuses therefore make conveying from different depths possible, with the result that, for example, one conveying means is loaded underground while the other is unloaded aboveground at the same time. This function is important, in particular, during the drilling of a shaft, since the depth of the shaft changes permanently here, in order to convey excavated material, for example, or to perform work in the shaft during the drilling. Here, particular value is placed on a rapid coupling operation with high reliability in terms of function, operation and availability.

The prior art of a coupling apparatus for a drum hoist from 1987 supplied by the company Gutehoffnungshütte, Aktienverein für Bergbau and Hüttenbetrieb (GHH for short) will be explained in greater detail using the partial section through a coupling apparatus of FIG. 1. (The designations which are present in the description of the prior art relate exclusively to FIG. 1.) An internally toothed drum wheel (1) is screwed to a side plate of a movable drum (not shown). Just like the fixed drum (not shown), a shaft wheel (2) is connected fixedly via flanges to the main shaft (not shown) so as to rotate with it. A coupler wheel (5), a sliding ring (6) and a switching element which is configured as a switching ring (7) are arranged axially displaceably on the external toothing system (4) of the shaft wheel (2). The switching ring (7) is connected fixedly to the frame on brackets, connected to the foundation of the double drum hoist, for the hydraulic displacing cylinders (not shown). The switching ring (7) slides in a circumferential groove (8) of the sliding ring (6), whereas the movable drum (not shown) rotates in the engaged state of the coupling apparatus. The engagement and disengagement of the coupling apparatus takes place at the standstill of the double drum hoist secured by brakes. Here, the hydraulic displacing cylinders secure the position of the coupler wheel (5) which can be displaced axially in the engagement and disengagement direction on the external toothing system (4) of the shaft wheel (3).

During operation of the known coupling apparatus for a double drum hoist, the problem has occurred in the majority of the double drum hoists that the coupler wheel (5) moved in the disengagement direction during the rotation and conveying with the movable drum, as a result of which considerable forces were exerted on the hydraulic displacing cylinders and on the switching ring (7) which is provided with sliding metal (9) on the end side. As a consequence, the grease lubrication between the groove (8) of the sliding ring (6) and the sliding metal (9) failed as a result of overheating, and the sliding metal (9) subsequently melted. It was never possible to determine the reason for this disengagement of the coupler wheel (5) under load of the movable drum in said double drum hoists. One possible approach to explain this was tumbling movements of the side plate on the drum wheel.

In order to avoid the movement in the disengagement direction under load of the movable drum, screws or bolts were installed retrospectively on the shaft wheel (2), which screws or bolts prevented an axial displacement of the coupler wheel. The coupling operation therefore requires that a mechanic first of all removes the retrospectively installed screws or bolts in a time-intensive manner, and ends with the mechanic subsequently attaching the elements again. Assembly steps of this type are not acceptable for the operation of a drum hoist with a coupling apparatus, in particular in drilling operation with frequent coupling operations.

DE 922 194 B discloses a drum hoist having a coupling apparatus, in which a movable drum which is provided with a brake can be coupled to a driven main shaft. A displacement sleeve with an external toothing system is attached as coupler device on a grooved part of the drive shaft. The external toothing system can be brought into and out of engagement with an internal toothing system of an intermediate part which is connected fixedly to the movable drum so as to rotate with it, by way of displacement of the displacement sleeve in the axial direction of the drive shaft. The displacement of the displacement sleeve takes place by way of a movement device which is installed on the drum shaft.

BRIEF SUMMARY OF THE INVENTION

Proceeding from this prior art, the invention is therefore based on the object of providing a drum hoist, the coupling apparatus of which effectively prevents an undesired disengagement of the coupler wheel of the coupling apparatus, in particular under load of the movable drum, without mounting additional elements.

The solution to this problem utilizes the circumstance that, although the drive of the drum hoist has to apply clockwise or counterclockwise moments, the direction of the torque which is applied to the main shaft by each individual drum does not change, but the magnitude certainly changes depending on the depth and loading. In detail, the object is achieved in a drum hoist of the type mentioned at the outset by virtue of the fact that at least one locking body is fastened to the coupler wheel, the teeth of the internal toothing system of the drum wheel have a groove for receiving the locking body, which groove runs in the circumferential direction of the drum wheel, there is a play between the teeth of the internal toothing system of the drum wheel and the teeth of the external toothing system of the coupler wheel, with the result that each locking body can be brought into and out of engagement with one of the grooves by rotation of the engaged coupler wheel with respect to the drum wheel by the amount of the play.

The torque which is transmitted to the main shaft by the movable drum holds the locking bodies of the engaged coupler wheel reliably in their position, in which they are latched in the groove. The play between the teeth of the internal toothing system of the drum wheel and the teeth of the external toothing system of the coupler wheel is caused by virtue of the fact that, in the case of the internal toothing system of the drum wheel, the tooth flanks are displaced on one side in the circumferential direction. This produces a sufficient play with respect to the teeth of the external toothing system of the coupler wheel, with the result that each locking body can be brought into and out of engagement with one of the grooves by rotation of the engaged coupler wheel with respect to the drum wheel by the amount of the play.

The locking bodies which can be brought into engagement in the grooves effectively prevent a displacement of the coupler wheel axially in both directions. In this way, not only the previously observed effect of an undesired disengagement of the coupler wheel is prevented, but rather also an undesired movement in the opposite direction of the coupler wheel in the engagement direction. This would burn the grease in the same way and cause the sliding metal to melt.

The locking body is arranged, in particular, on the rear end side in the engagement direction of the coupler wheel of one of the teeth of the external toothing system of the coupler wheel. The arrangement of the locking body on the end side permits retrofitting of existing drum hoists with the coupling apparatus.

Each locking body protrudes beyond one of the two tooth flanks of one of the teeth of the external toothing system of the coupler wheel, the said one of the two tooth flanks being the tooth flank which bears against a tooth flank of the drum wheel under the load of the torque which is applied to the main shaft by the movable drum. Instead of on the end side, the locking body can also be arranged on the tooth flank itself and can extend from the surface of the tooth flank into the tooth space.

Depending on the number of teeth and the load, a plurality of locking bodies are preferably screwed on the end sides of the teeth of the external toothing system of the coupler wheel over the circumference of the coupler wheel.

The locking body is configured, in particular, as a plate and projects in the circumferential direction somewhat beyond the tooth flank. It latches into the provided groove by way of rotation of the coupler wheel.

In order to limit the displacement travel of the coupler wheel in the engagement direction, the drum hoist has at least one stop. The stop is positioned in such a way that, when the coupler wheel is in contact, each locking body lies in an extension of one of the grooves which run in the circumferential direction. In a structurally advantageous manner, the stop is fastened to the coupler wheel and has a stop face for a tooth of the internal toothing system of the drum wheel.

In one particularly advantageous refinement of the invention, the stop and at least one locking body, but preferably two locking bodies, are connected to one another in one piece to form a locking pawl. The locking pawls are preferably configured in such a way that they can also be mounted without a change to the construction, in such a way that the locking bodies also latch in a different rotational direction of the drum wheel. If locking pawls of this type are used, the coupling apparatus is designed for both moment directions. This avoids errors in production and makes the components independent of the direction of the torque of a drum.

Automatic precise positioning of the locking body in an extension of the groove is achieved if a side wall of the groove interacts with the stop face of the stop. This interaction is preferably brought about by the fact that a part, which protrudes when the coupler wheel is engaged, of each tooth of the internal toothing system of the drum wheel has a lower tooth height than the part, which is in engagement, of each tooth of the internal toothing system of the drum wheel, the groove runs in the projecting part, and the tooth height of the projecting part is defined in such a way that, in the case of an axial displacement of the coupler wheel in the engagement direction, exclusively the end side of that part of the tooth which is in engagement comes into contact with the stop face.

In order to hold the locking body in position and to absorb the forces when the hydraulic cylinders move the stop against the teeth of the drum wheel under full load, in one advantageous refinement of the invention the locking body is connected to a reinforcing element which is fastened to the coupler wheel.

Moreover, a filler piece can be arranged between the reinforcing element and the locking body, in order to bridge the distance to the reinforcing element. The filler piece and the reinforcing element can also be configured in one piece.

In order to achieve satisfactory guidance of the coupler wheel during the axial displacement, not only the coupler wheel, but rather, moreover, the sliding ring is toothed on the inside. The length of the toothing system of the coupler wheel and the sliding ring ensures that reliable axial guidance takes place without jamming.

For reasons of production technology, the coupler wheel and the sliding ring are preferably configured as separate components which are connected fixedly to one another so as to rotate together. However, the coupler wheel and the sliding ring can also be configured in one piece.

In the interests of satisfactory guidance, the internal toothing systems of the coupler wheel and the sliding ring are preferably configured as a trapezoidal toothing system. The external toothing system of the coupler wheel and the internal toothing system of the drum wheel, which internal toothing system meshes with the coupler wheel, are preferably configured as an involute toothing system.

In order for it to be possible to move the sliding ring and the coupler wheel which is connected to it in the engagement or disengagement direction with the aid of the switching element, in one advantageous refinement of the invention the sliding ring is provided with an annular collar which is connected fixedly to the sliding ring so as to rotate with it. The switching element comprises at least one, preferably two hydraulic cylinders, the piston rod of which is provided in each case on the end side with a claw which reaches around the collar. In order to guide and to position the claws, they are preferably connected to one another via a frame element. The frame element can be, in particular, of annular configuration, the ring being aligned with the collar which surrounds the coupler wheel. Preferably replaceable wear elements are arranged between the annular frame element and the collar. The toothing system of the shaft wheel is configured to be so long that the coupler wheel and the sliding ring can also be operated with only one cylinder without jamming. This is important in case a cylinder should be or should become stiff.

BRIEF DESCRIPTION OF THE DRAWINGS

In the following text, the invention will be explained in greater detail using the figures, in which.

DETAILED DESCRIPTION OF THE PREFERRED EMBODIMENTS

Figure 1:
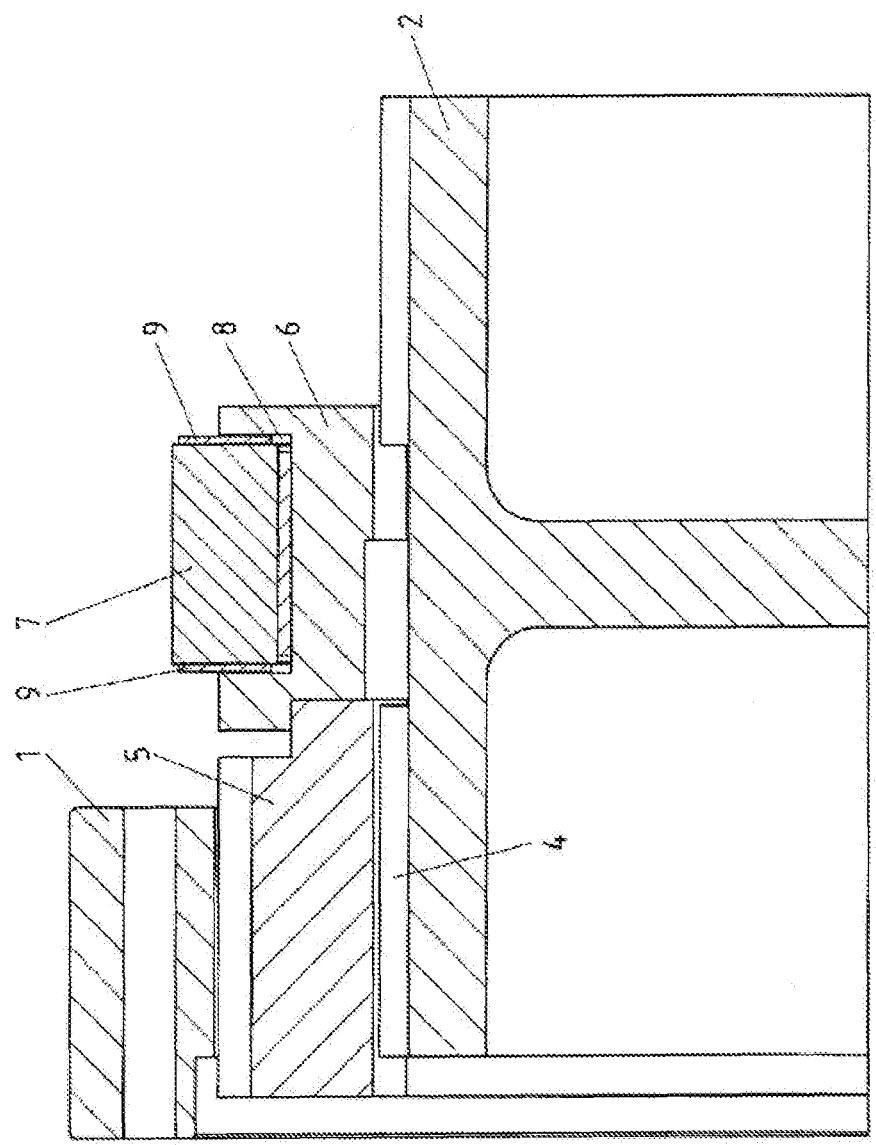
FIG. 1 shows a partial section through a prior art coupling apparatus.
Figure 2:
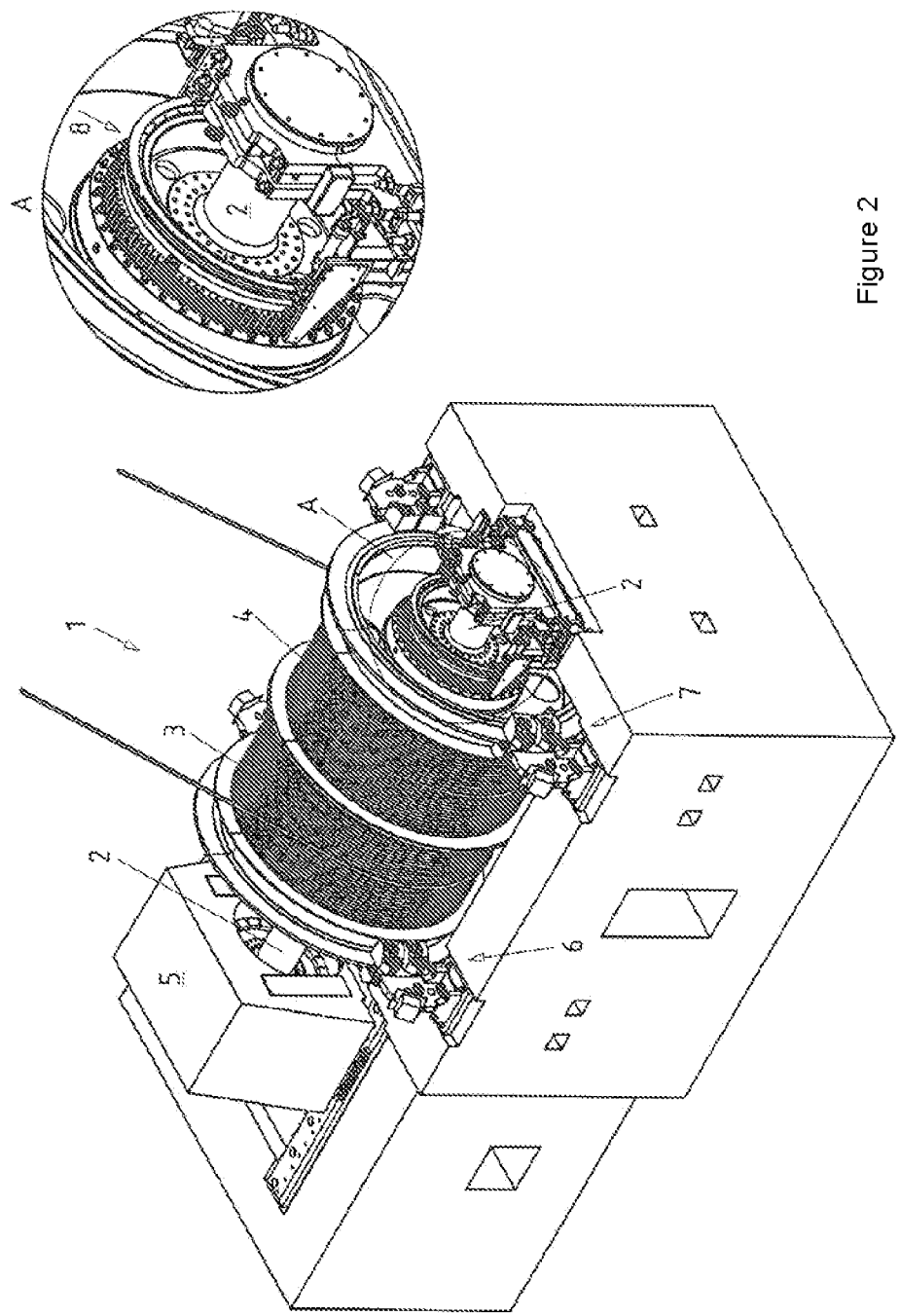
FIG. 2 shows a perspective overall view of a double drum hoist having a coupling apparatus according to an embodiment of the invention.

FIG. 2 shows a drum hoist (1) having a fixed drum (3) which is arranged on a main shaft (2), and having a movable drum (4). The main shaft (2) is driven by a drive motor (5).

Both the fixed drum (3) and the movable drum (4) in each case have a disk brake (6, 7). The movable drum (4) is connected releasably to the main shaft (2) via a coupling apparatus (8) (cf. detail A).

Figure 3:
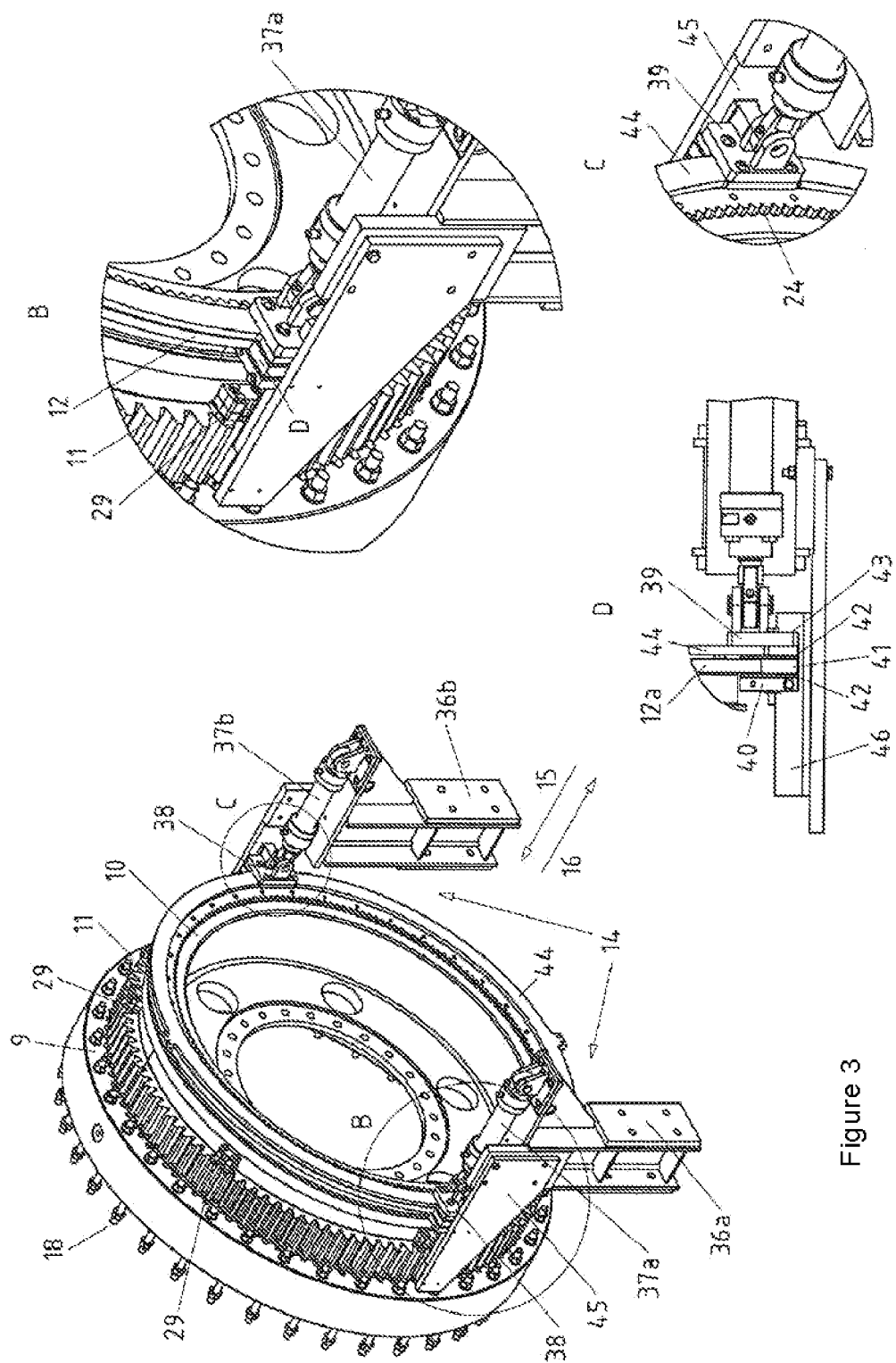
FIG. 3 shows a perspective illustration of the coupling apparatus of FIG. 2.

The coupling apparatus (8) which is shown on an enlarged scale in FIG. 3 comprises a drum wheel (9) which is screwed to the movable drum (4), a shaft wheel (10) which is connected fixedly to the main shaft (2) so as to rotate with it, and a coupler wheel (11) which can be displaced in the axial direction. A sliding ring (12) is connected fixedly on the end side to the coupler wheel (11) so as to rotate with it.

A switching apparatus (14) for displacing the sliding ring (12) in an engagement direction (15) and in a disengagement direction (16) is arranged fixedly on the frame of the drum hoist (1).

Figure 4:
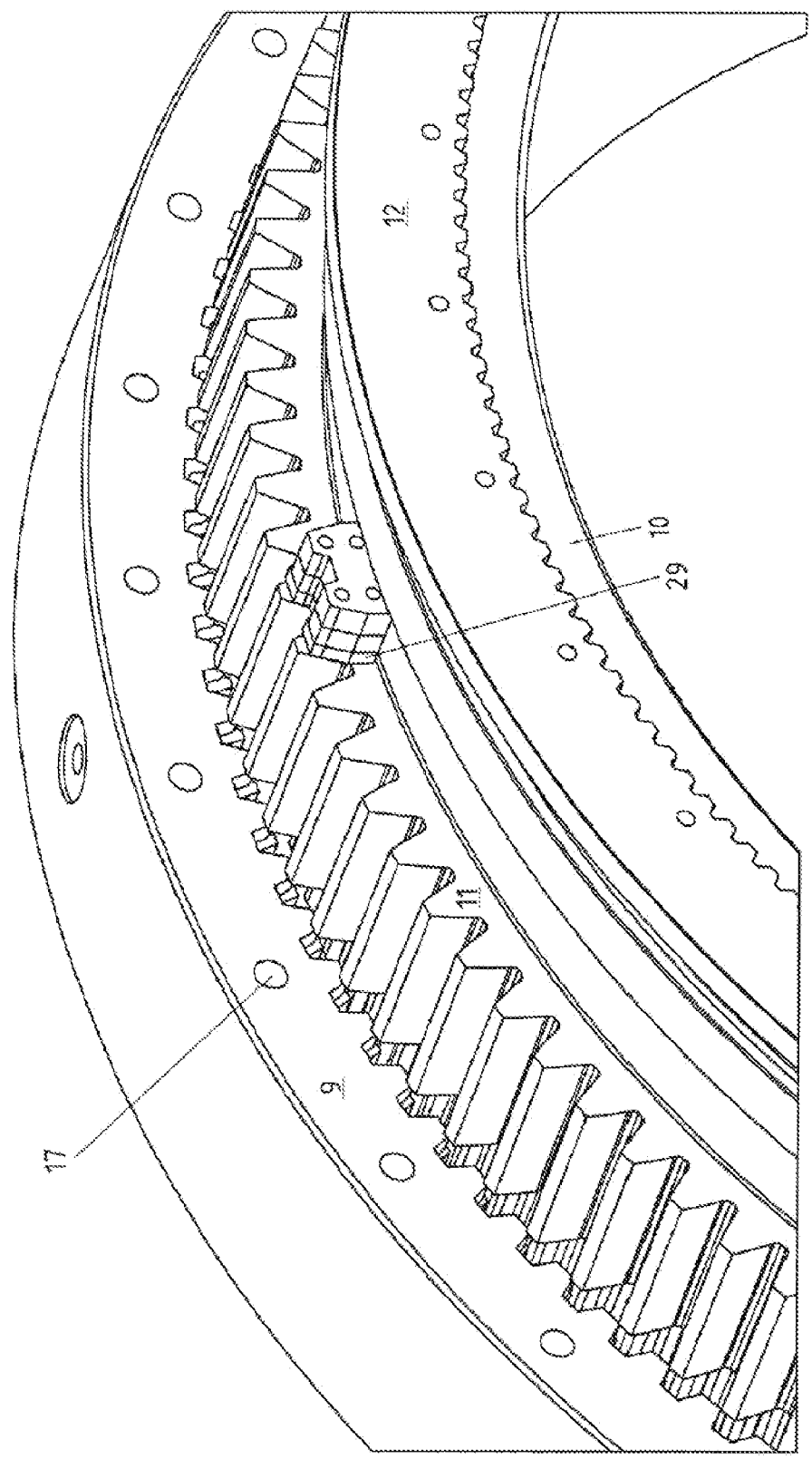
FIG. 4 shows a perspective partial illustration of a drum, coupler and shaft wheel of the coupling apparatus according to FIG. 3, FIGS. 5a-c show the coupling apparatus of FIG. 2 during the engagement of the coupler wheel.

It can be seen from FIG. 3 in conjunction with FIG. 4 that the drum wheel (9) is screwed by means of screws (18) to the movable drum (4), through passages (17) which are distributed uniformly over its circumference.

Figure 5B:
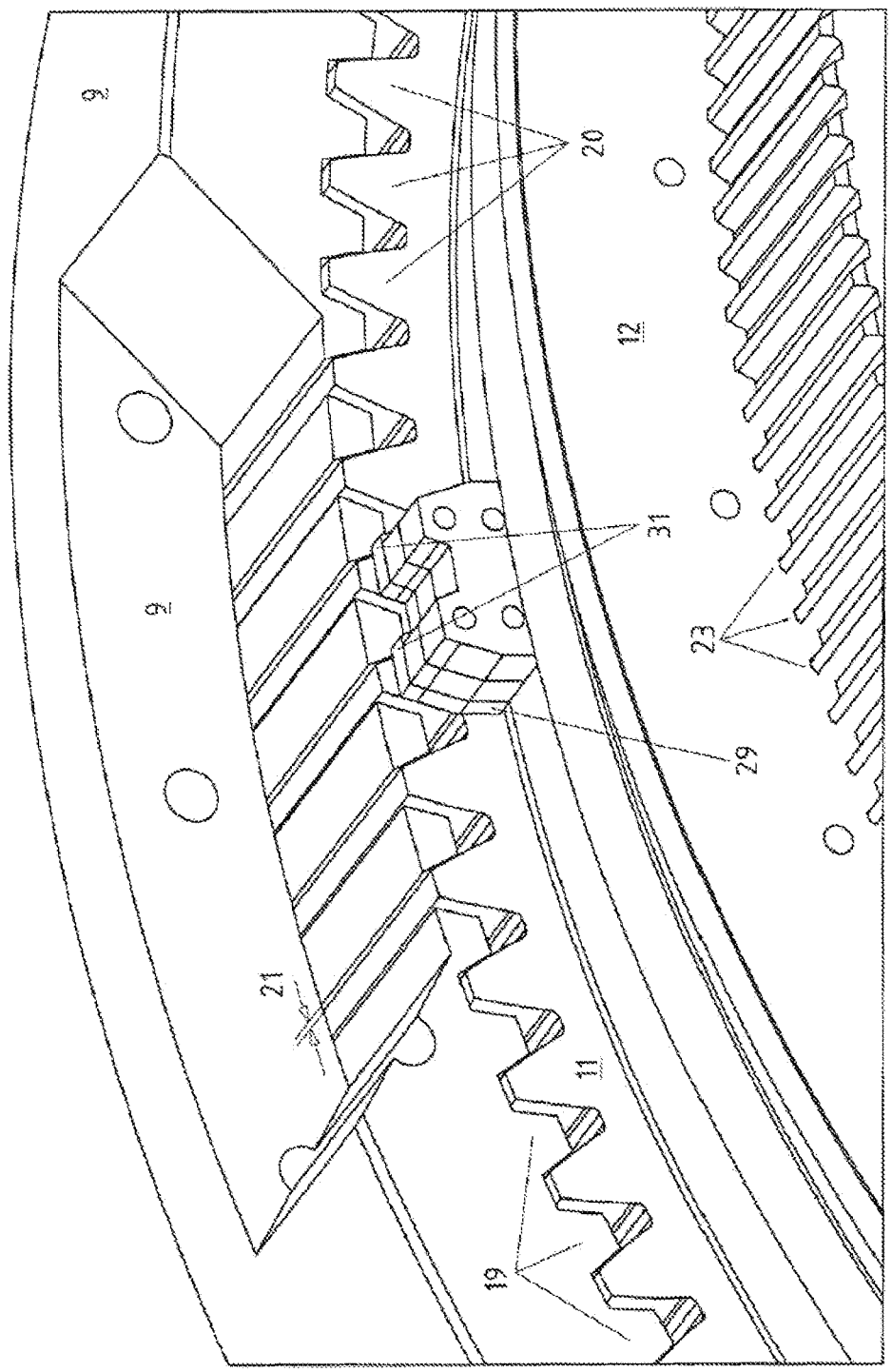
Figure 5C:
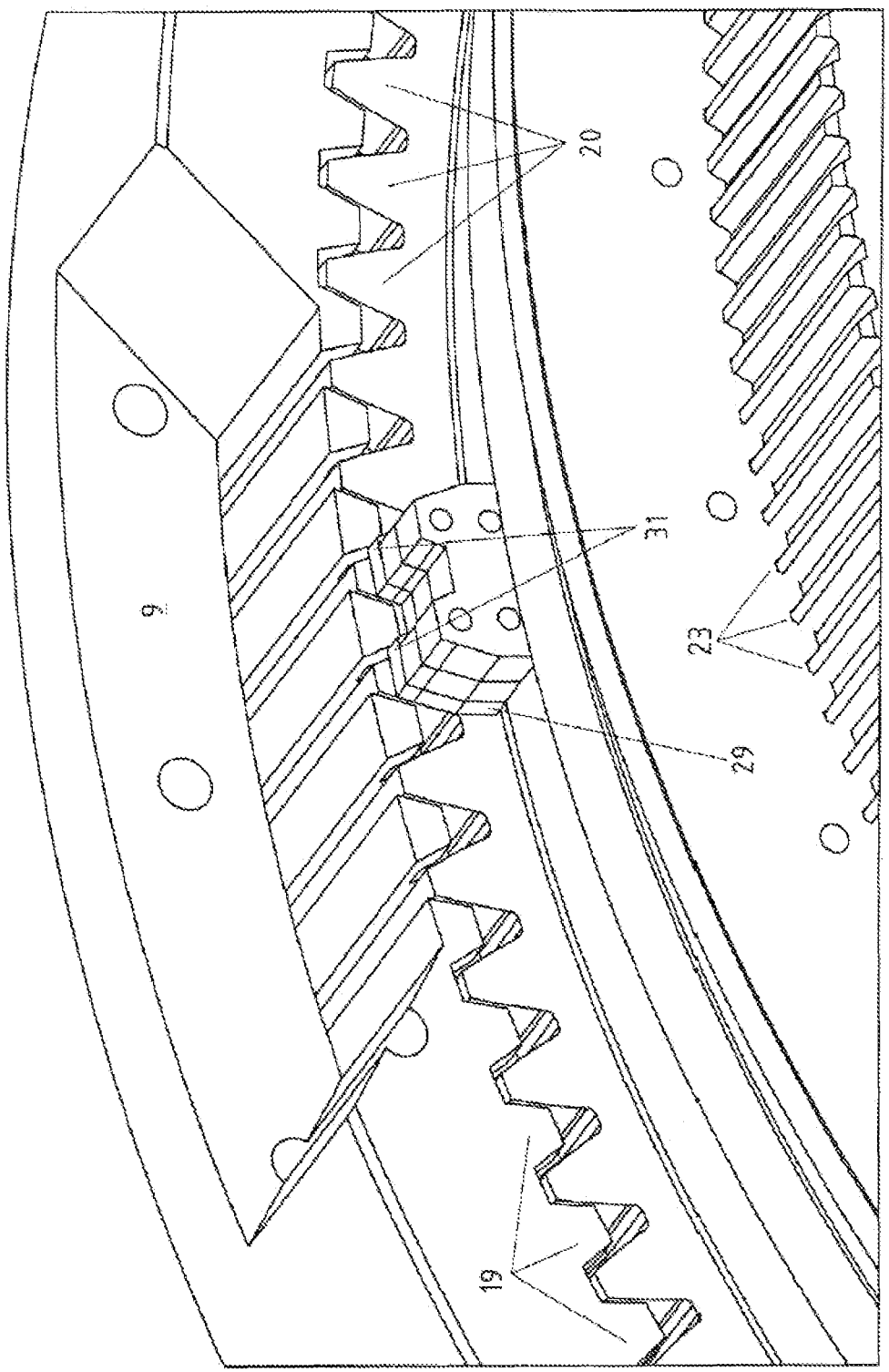
Figure 5D:
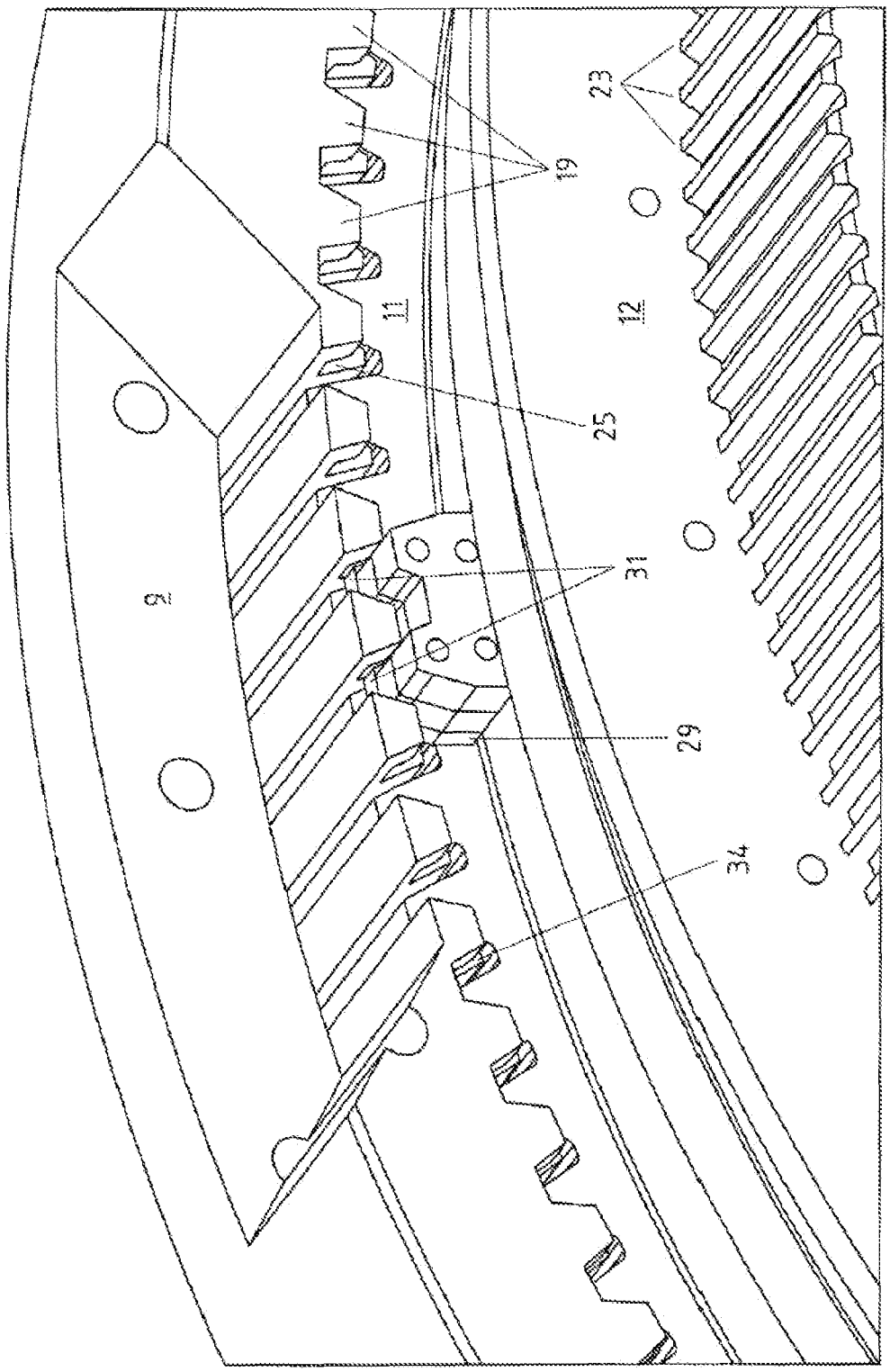
Figure 6A:
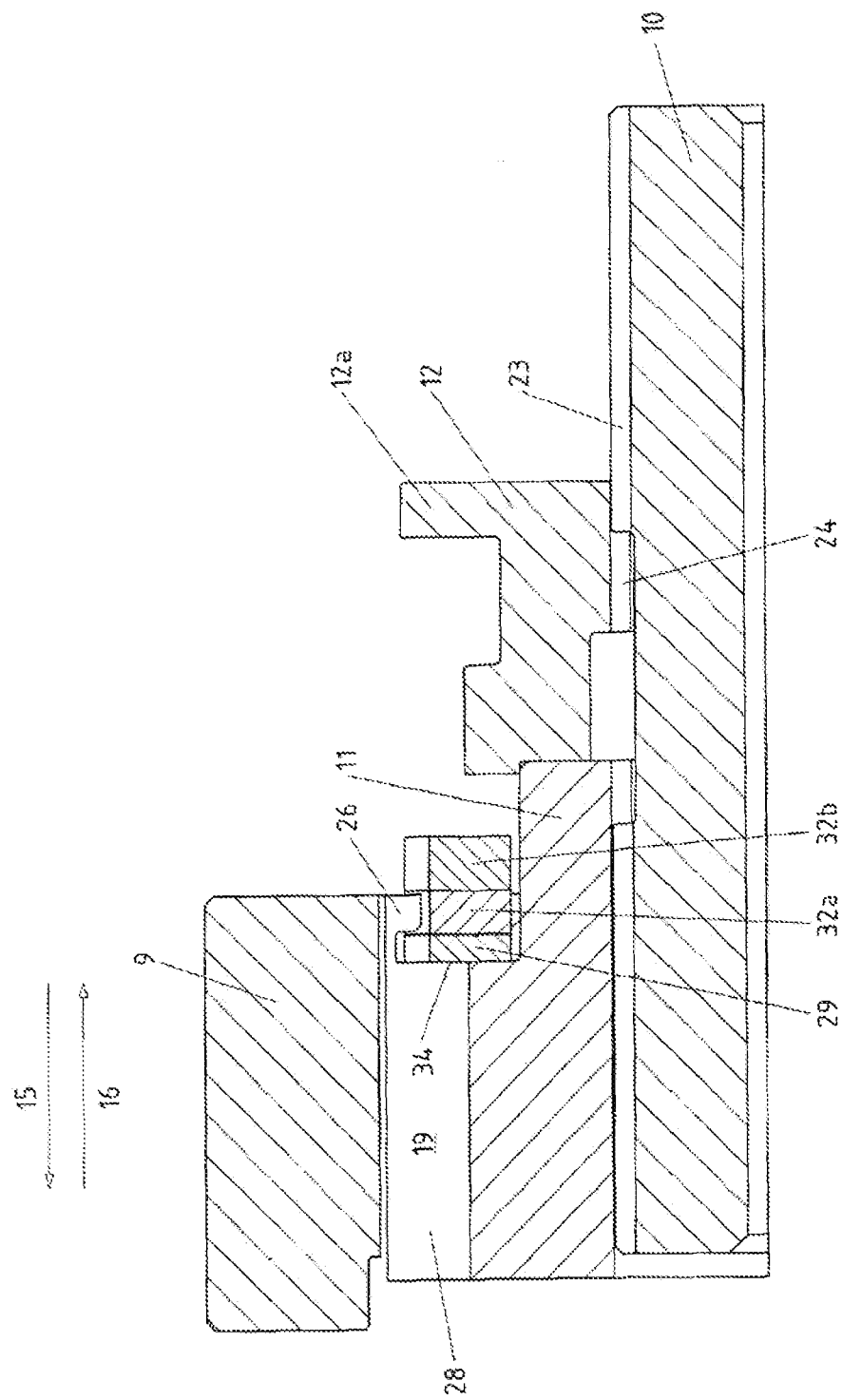
FIG. 6a shows a partial section through a coupling apparatus according to an embodiment of the invention with an engaged coupler wheel.
Figure 6B:
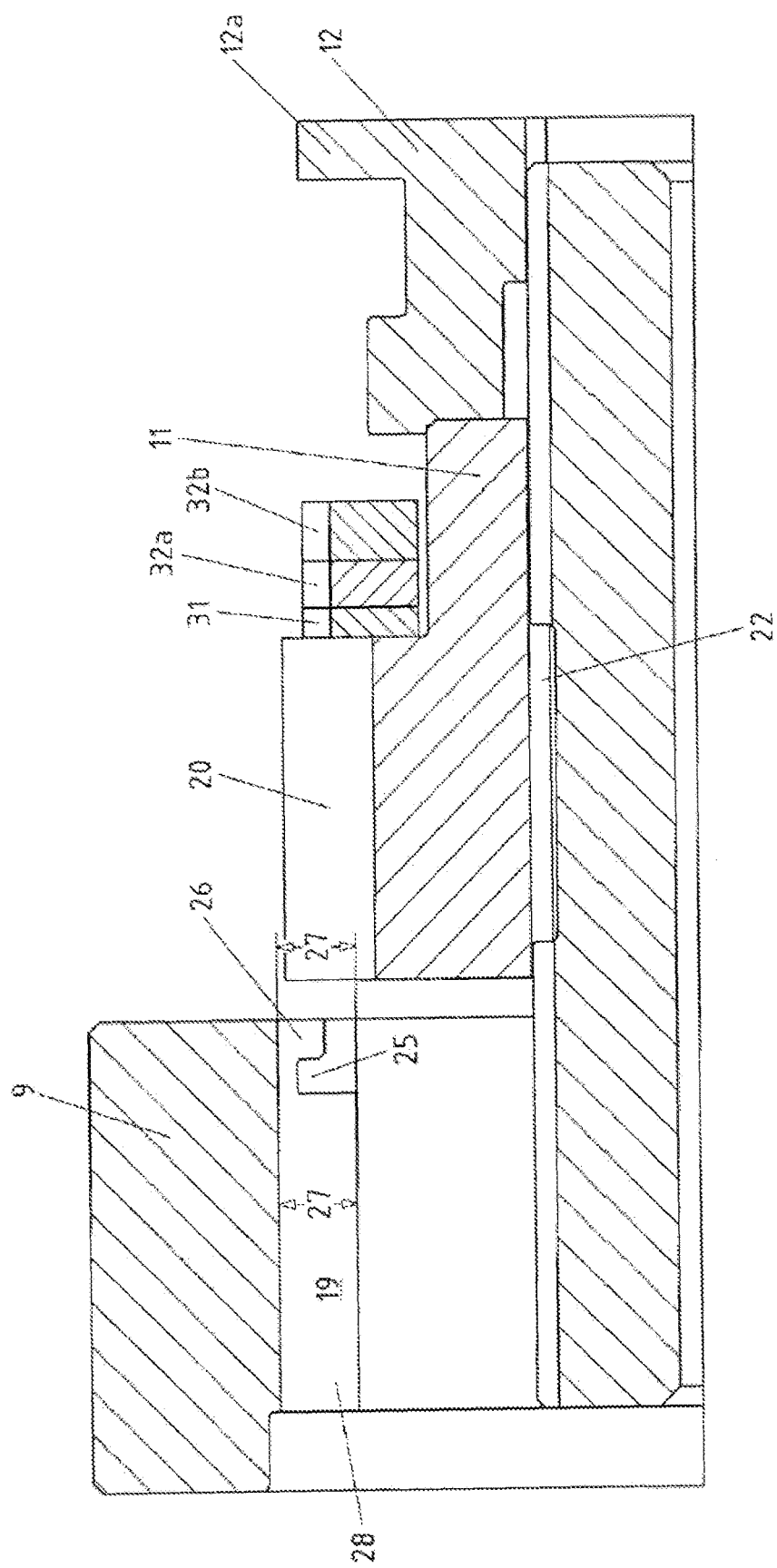
FIG. 6b shows a partial section through the coupling apparatus of FIG. 6a with a disengaged coupler wheel.

As can be seen, in particular, from FIGS. 6a, b, the drum wheel (9) has an internal toothing system (19) which is configured as an involute toothing system. One of the tooth flanks (19a) of all the teeth of the internal toothing system (19) is displaced on the circumference, in order to provide a sufficient play (21) between the teeth of the internal toothing system (19) of the drum wheel (9) and the teeth of an external toothing system (20) of the coupler wheel (11). Said play (21), as can be seen, in particular, from FIGS. 5b, c, is necessary for locking the coupling apparatus (8).

The external toothing system (20) of the coupler wheel (11) is likewise configured as an involute toothing system. Moreover, the coupler wheel (11) has an internal toothing system (22). The internal toothing system (22) of the coupler wheel (11) can be displaced axially in the engagement and disengagement direction (15, 16) on an external toothing system (23) of the shaft wheel (10). The toothing systems of the coupler wheel (11) and the shaft wheel (10) are configured as trapezoidal toothing systems. In the engaged state which is shown in FIG. 6a, the coupler wheel (11) connects the drum wheel (9) via the shaft wheel (10) to the main shaft (2) in a non-positive manner.

The sliding ring (12) likewise has an internal toothing system (24) which is likewise configured as a trapezoidal toothing system and can be displaced axially in the engagement and disengagement direction (15, 16) on the external toothing system (23) of the shaft wheel (10).

The shaft wheel (10) and its external toothing system (23) are so long in the engagement and disengagement direction (15, 16) that the coupler wheel (11) and the sliding ring (12) are guided until complete disengagement of the coupler wheel (11).

The teeth of the internal toothing system (19) of the drum wheel (9) all have a groove (25) which runs in the circumferential direction and extends between the tooth flanks (19a, b) of each tooth.

Each groove (25) is delimited laterally on one side by way of a part (26), which protrudes in the case of an engaged coupler wheel (11), of a tooth of the internal toothing system (19) and on the other side by way of a part (28), which is in engagement, of a tooth of the internal toothing system (19). The protruding part (26) has a tooth height (27) which is lower than the tooth height (27) of that part (28) of the tooth which is in engagement.

As can be seen, in particular, from FIG. 3 in conjunction with FIGS. 5a-g, a plurality of locking pawls (29) are screwed on the circumference of the coupler wheel (11) on the rear end side (in the engagement direction (15) of the coupler wheel (11)) of the teeth of the external toothing system (20). Each locking pawl (29) has two locking bodies (31) which protrude slightly beyond the tooth flanks (20a) of the external toothing system (20) of the coupler wheel (11) in the circumferential direction. The tooth flanks (20a) are the tooth flanks which bear against the tooth flanks (19a) of the drum wheel (9) under the load of the torque which is applied to the main shaft (2) by the movable drum (4). A stop (33) which is configured in one piece with the two locking bodies (31) extends in the circumferential direction of the coupler wheel (11) between the two locking bodies (31) of each locking pawl (29), with which stop (33) the end side (34) of that part (28) of a tooth of the internal toothing system (19) of the drum wheel (9) which is in engagement comes into contact after complete engagement of the coupler wheel (11) (cf., in particular, FIG. 6a). Here, the tooth height (27) of the protruding part (26) is defined in such a way that, during axial displacement of the coupler wheel (11) in the engagement direction (15), exclusively the end side (34) but not the end side of the protruding part (26) butts against the stop face (33).

Each locking pawl (29) is backed by a filler piece (32a) and a reinforcing bar (32b) which are screwed together with the locking pawl (29) on the rear end side (30) of the external toothing system (20). The filler piece (32a) braces the locking pawl (29), in order to prevent deflections, and bridges the distance to the reinforcing bar (32b) which lies outside the internal toothing system (19) of the drum wheel (9) when the coupler wheel (11) is engaged completely. The reinforcing bar (32b) holds the locking pawl (29) in position and absorbs the forces when the hydraulic cylinders (37a, b) move onto the stop (33) under full load or when the coupler wheel (12) attempts to move axially in the disengagement direction. The reinforcing bar (32b) ensures that each locking pawl (29) and therefore each locking body (31) which engages into the groove (25) is subjected exclusively to a shear load.

The sliding ring (12) is surrounded by an annular collar (12a), on which the switching apparatus (14) acts which will be explained in greater detail in the following text using FIG. 3. The switching apparatus (14) comprises two brackets (36a, b) which are connected fixedly to a foundation of the drum hoist (1). In each case one hydraulic cylinder (37a, b) with a claw (38) which engages around the collar (12a) of the sliding ring (12) is connected in an articulated manner to each bracket (36a, b). The claw (38) consists of a flange plate (39) for the articulated connection of the piston rod, and a counterplate (40) which is arranged at a parallel spacing from the flange plate (39). A wear spacer element (41) as radial stop for the annular collar (12a), and two wear plates (42) which bear against the side edges of the annular collar (12a), are situated between the two plates (39, 40). Both the wear spacer element (41) and the wear plates (42) are composed, for example, of brass.

The claw (38) dips laterally into a groove (43) of a guide element (46) which can be displaced in the engagement and disengagement direction (15, 16) on a side cheek (45) of the bracket (36a, b). In order to prevent migration of the claws (38), the two claws (38) are connected to one another via an annular frame element (44). The connection takes place with the aid of through screws which penetrate the flange plate (39), the counterplate (40), the wear spacer element (41), the wear plates (42) and the frame element (44).

In the following text, the method of operation of the coupling apparatus (8) of the drum hoist (1) will be explained using FIGS. 5a-5g.

Figure 5A:
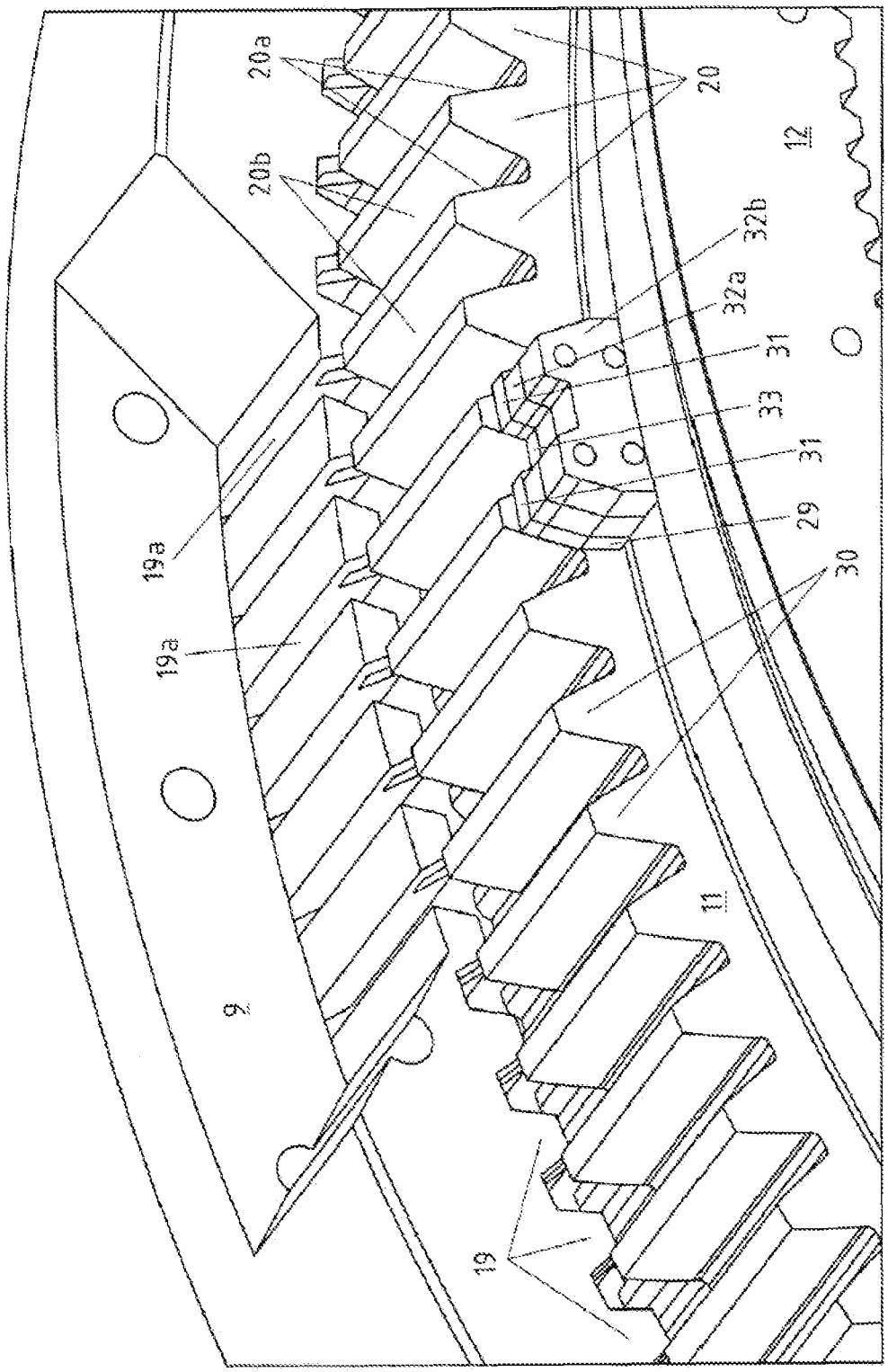
FIG. 5d shows the coupling apparatus of FIG. 2 with a completely engaged coupler wheel.
FIG. 5e shows the coupling apparatus of FIG. 2 with a completely engaged coupler wheel in the locked state.
FIG. 5f shows the coupling apparatus of FIG. 2 with a completely engaged coupler wheel in the unlocked state.
FIG. 5g shows the coupling apparatus of FIG. 2 with a completely disengaged coupler wheel.

FIG. 5a shows the drum wheel (9) which is decoupled from the main shaft (2) and is fixed via the disk brake (7) of the movable drum (4). With the aid of the drive motor (5), the teeth of the external toothing system (20) of the coupler wheel (11) are oriented in an aligned manner with respect to the tooth spaces of the internal toothing system (19) of the drum wheel (9), as can be seen in FIG. 5a. Subsequently, the hydraulic cylinders (37a, b) of the switching apparatus (14) are loaded, with the result that the coupler wheel (11) is displaced axially in the engagement direction (15), until the external toothing system (20) of the coupler wheel (11) is completely in engagement with the internal toothing system (19) of the drum wheel (9), as can be seen from FIG. 5d. At this time, the end side (34) of the internal toothing system (19) of the drum wheel (9) comes into contact with the stop (33) of the locking pawl (29), which ensures that each locking body (31) lies in an extension of one of the grooves (25) which run in the circumferential direction. The disk brake (7) of the movable drum (4) is then released, as a result of which the drum wheel (9) rotates in the counterclockwise direction with respect to the coupler wheel (11) on account of the torque which is applied by the movable drum (4). As a result of this rotation, each locking body (31) passes into one of the grooves (25) in the teeth of the internal toothing system (19), as shown in FIG. 5e.

The movable drum (4) which is coupled in this way to the coupling apparatus (8) can then be set in rotation together with the fixed drum (3) via the main shaft (2). The risk of migration of the coupler wheel (12) in or counter to the disengagement direction is prevented effectively by way of the locking bodies (31) which are in engagement independently of the rotational direction of the main shaft (2).

Figure 5F:
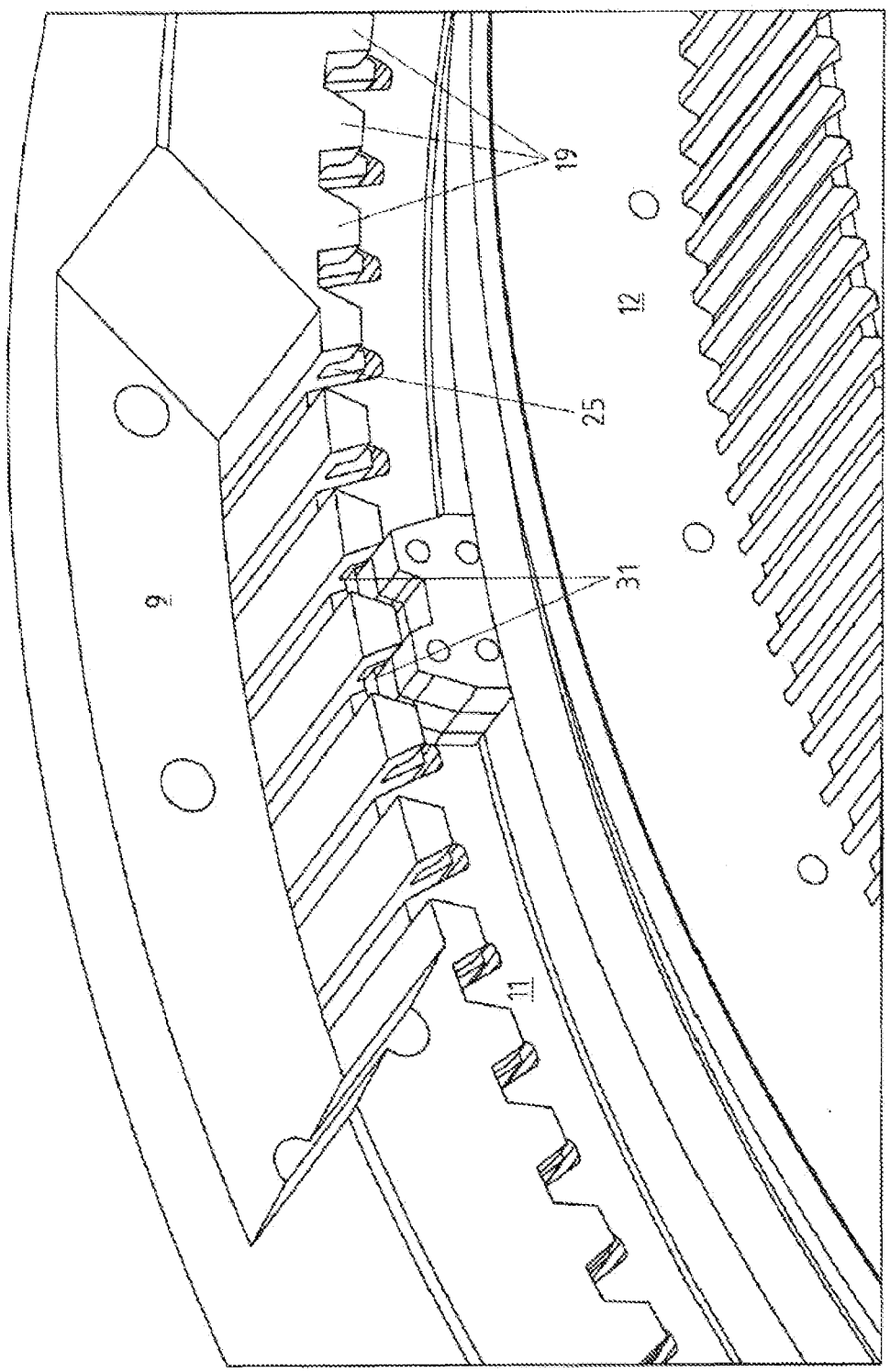
Figure 5G:
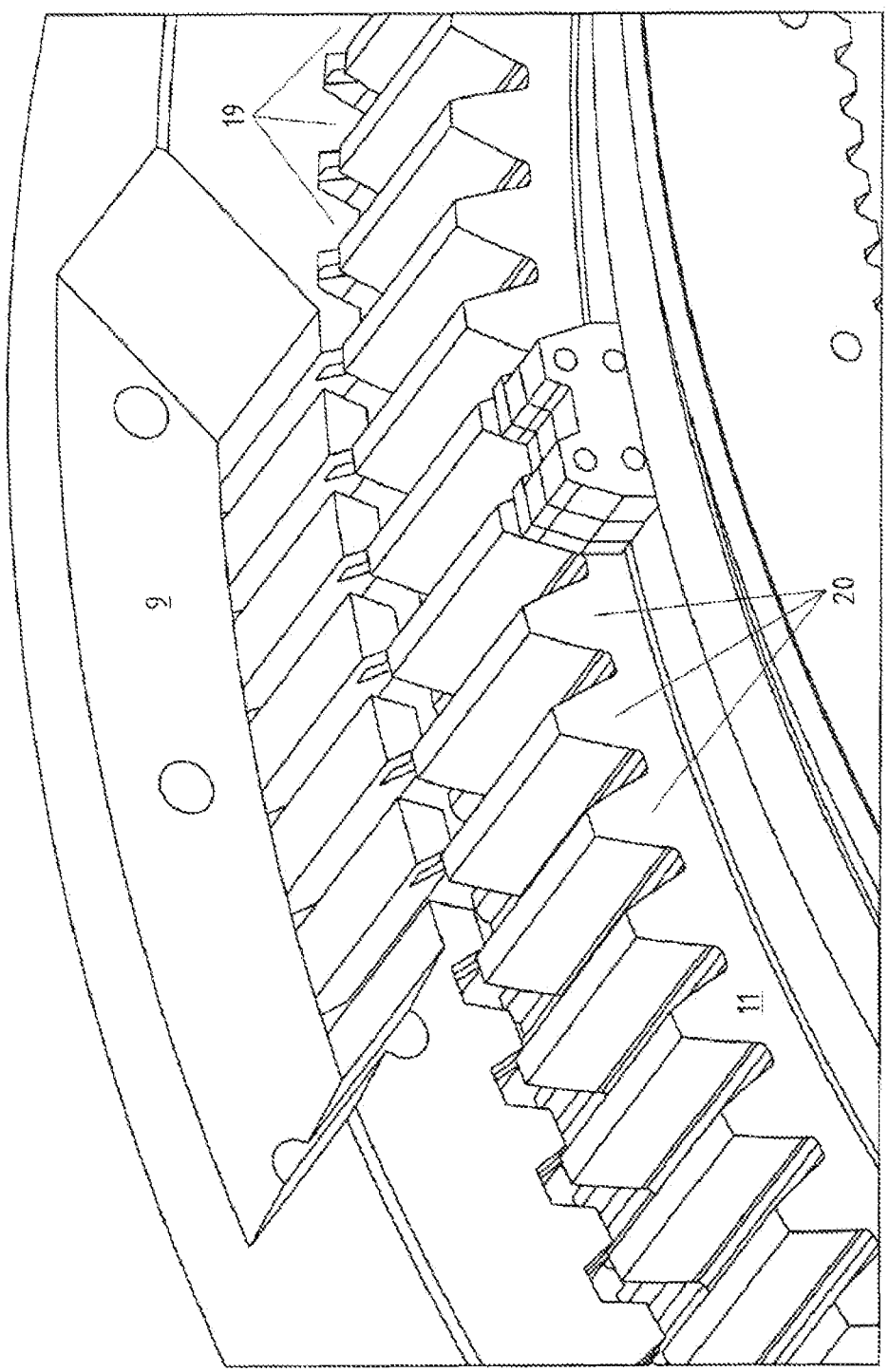

If the movable drum (4) is then to be decoupled, the movable drum (4) is first of all fixed again by way of the disk brake (7) before the decoupling of the coupler wheel (11). Each locking body (31) is brought out of engagement by way of rotation of the engaged coupler wheel (11) in the counterclockwise direction by the amount of the play (21) with the aid of the drive motor (5) with respect to the drum wheel (9) which is then fixed, as can be seen in FIG. 5f. Subsequently, the coupler wheel (11) is displaced with the aid of the hydraulic cylinders (37a, b) which can be loaded on both sides, until the external toothing system (20) of the coupler wheel (11) is out of engagement with the internal toothing system (19) of the drum wheel (9). Then, for further operation of exclusively the fixed drum (3), the main shaft (2) is set in rotation, while the decoupled movable drum is held fixedly by the brake device (7).

List of Designations

| No. | Designation |
|---|---|
| 1 | Drum hoist |
| 2 | Main shaft |
| 3 | Fixed drum |
| 4 | Movable drum |
| 5 | Drive motor |
| 6 | Disk brake |
| 7 | Disk brake |
| 8 | Coupling apparatus |
| 9 | Drum wheel |
| 10 | Shaft wheel |
| 11 | Coupler wheel |
| 12 | Sliding ring |
| 12a | Annular collar |
| 13 | — |
| 14 | Switching apparatus |
| 15 | Engagement direction |

-continued

List of Designations

| No. | Designation |
|---|---|
| 16 | Disengagement direction |
| 17 | Passages |
| 18 | Screws |
| 19 | Internal toothing system (T9) |
| 19a, b | Tooth flank |
| 20 | External toothing system (K11) |
| 20a | Tooth flank |
| 21 | Play |
| 22 | Internal toothing system (K11) |
| 23 | External toothing system (W11) |
| 24 | Internal toothing system (Schl2) |
| 25 | Groove |
| 26 | Projecting part |
| 27 | Tooth height |
| 28 | Part which is in engagement |
| 29 | Locking pawls |
| 30 | Rear end side (position missing in figures) |
| 31 | Locking body = 29?? |
| 32a | Filler piece |
| 32b | Reinforcing bar |
| 33 | Stop |
| 34 | End side |
| 35 | — |
| 36a, b | Bracket |
| 37a, b | Hydraulic cylinder |
| 38 | Claw |
| 39 | Flange plate |
| 40 | Counterplate |
| 41 | Wear spacer element |
| 42 | Wear plates |
| 43 | Groove |
| 44 | Frame element |
| 45 | Side cheek |
| 46 | Guide element |
| 47 | |
| 48 | |
| 49 | |
| 50 | |
| 51 | |
| 52 | |
| 53 | |
| 54 | |
| 55 | |
| 56 | |

The invention claimed is:

1. A drum hoist, comprising:
a driven main shaft;
a movable drum arranged on said main shaft with a brake;
a coupling apparatus for releasably connecting said movable drum and said main shaft, the coupling apparatus comprising:
a drum wheel with an internal toothing system, said drum wheel being connected fixedly to said movable drum so as to rotate with it;
a shaft wheel with an external toothing system, said shaft wheel being connected fixedly to said main shaft so as to rotate with it;
a coupler wheel with an external toothing system and an internal toothing system, said coupler wheel being axially displaceable in an engagement direction and a disengagement direction on said external toothing system of said shaft wheel;
a sliding ring connected fixedly on an end side to said coupler wheel so as to rotate with it; and
a switching apparatus arranged fixedly on a frame of said drum hoist for displacing said sliding ring in the engagement and disengagement direction, said switching apparatus being actuatable in the engagement direction to bring said external toothing system of said coupler wheel into engagement with said internal toothing system of said drum wheel, and actuatable in the disengagement direction to bring said external toothing system of said coupler wheel out of engagement with said internal toothing system of said drum wheel; and
at least one locking body fastened to said coupler wheel, wherein the teeth of said internal toothing system of said drum wheel have a groove for receiving said locking body, said groove extending in a circumferential direction of said drum wheel, with play between the teeth of said internal toothing system of said drum wheel and the teeth of said external toothing system of said coupler wheel, such that each said at least one locking body can be brought into and out of engagement with one of said grooves by rotation of said engaged coupler wheel with respect to said drum wheel by an amount of the play.

2. The drum hoist according to claim 1, wherein said each said at least one locking body is arranged on a rear end side in the engagement direction of said coupler wheel of one of the teeth of said external toothing system of said coupler wheel.

3. The drum hoist according to claim 1, wherein said each said at least one locking body protrudes beyond one of two tooth flanks of one of the teeth of said external toothing system of said coupler wheel, said one of said two tooth flanks being said tooth flank which bears against a tooth flank of said drum wheel under the load of the torque which is applied to said main shaft by said movable drum.

4. The drum hoist according to claim 1, further comprising at least one stop which limits the axial displaceability of said coupler wheel in the engagement direction.

5. The drum hoist according to claim 4, wherein said stop is fastened to said coupler wheel and has a stop face for a tooth of the internal toothing system of said drum wheel.

6. The drum hoist according to claim 4, wherein said stop and said at least one locking body are configured in a single piece.

7. The drum hoist according to claim 4, wherein
each tooth of said internal toothing system of said drum wheel has a first part that protrudes and a second part that is in engagement when said coupler wheel is engaged, said first part has a lower tooth height than that of said second part of said each tooth;
said groove runs between said first part and said second part; and
the tooth height of said first part is defined such that, during an axial displacement of said coupler wheel in the engagement direction, exclusively the end side of said second part of said each tooth which is in engagement comes into contact with said stop.

8. The drum hoist according to claim 1, wherein said locking body is connected to a reinforcing element fastened to said coupler wheel.

9. The drum hoist according to claim 1, wherein said sliding ring has an internal toothing system which can be displaced axially in the engagement and disengagement direction on said external toothing system of said shaft wheel.

10. The drum hoist according to claim 1, further comprising an annular collar surrounding and fixedly connected to said sliding ring so as to rotate with it, said switching apparatus having at least one hydraulic cylinder for displacing said sliding ring, each said at least one hydraulic cylinder having a piston rod provided on an end side with a claw which reaches around said annular collar.

11. The drum hoist according to claim 10, wherein said claws are connected to one another by a frame element.

12. A method for disengaging the coupling apparatus of the drum hoist according to claim 1, the method comprising:
  fixing the movable drum using the brake before the disengagement of the coupler wheel;
  bringing the each the at least one locking body out of engagement by rotation of the engaged coupler wheel with respect to the fixed drum wheel by the amount of the play in the direction of the torque which is applied to the main shaft by the movable drum,
  displacing the coupler wheel axially in the disengagement direction using the switching apparatus, until the external toothing system of the coupler wheel is out of engagement with the internal toothing system of the drum wheel, and
  setting the main shaft in rotation for further operation.

13. A method for engaging the coupling apparatus of the drum hoist according to claim 1, the method comprising:
  fixing the movable drum by way of the brake before the engagement of the coupler wheel,
  aligning the teeth of the external toothing system of the coupler wheel with tooth spaces of the internal toothing system of the drum wheel,
  axially displacing the coupler wheel axially in the engagement direction using the switching apparatus until the external toothing system of the coupler wheel is in engagement with the internal toothing system of the drum wheel and the each the at least one locking body lies in an extension of one of the grooves which run in the circumferential direction,
  rotating the drum wheel with respect to the coupler wheel by the amount of the play in the direction of the torque which is applied to the main shaft by the movable drum, such that the each the at least one locking body is brought into engagement with one of the grooves, and
  setting the main shaft in rotation for further operation.

* * * * *